July 27, 1954

G. E. REICHERTER 2,684,535

EXTERNAL CALIPER GAUGE FOR CHECKING
THE DIAMETERS OF CYLINDRICAL WORK
Filed April 5, 1952

INVENTOR:
GEORG E. REICHERTER
BY:

Patented July 27, 1954

2,684,535

UNITED STATES PATENT OFFICE 2,684,535

EXTERNAL CALIPER GAUGE FOR CHECKING THE DIAMETERS OF CYLINDRICAL WORK

Georg E. Reicherter, Esslingen (Neckar), Germany

Application April 5, 1952, Serial No. 280,708

Claims priority, application Germany April 7, 1951

2 Claims. (Cl. 33—168)

The present invention relates to external calliper gauges which are used for checking the diameters of cylindrical work.

When the known types of external calliper gauges are placed on cylindrical work to check or measure their diameters the gauges must be held by hand on to the work and are inevitably pressed against them. The contact pressure between the anvils of the calliper gauge and the cylindrical surface to be checked or measured is, therefore, dependent on the sense of touch of the person using the gauge. The two legs of the calliper gauge carrying the anvils are therefore pressed apart to a degree varying with the magnitude of the contact pressure. This may produce considerable measuring errors and it is an object of the present invention to provide a calliper gauge in the use of which these errors are reduced or eliminated.

It is therefore the main object of this invention to influence the distribution of weight of the gauge so that the centre of gravity of the gauge hangs below the axis of the work when the gauge rests without extraneous support on the work.

An external calliper gauge constructed according to the invention need merely be placed on the cylindrical workpiece to be measured, and if the latter is horizontal, the gauge may be left to itself without any risk of its falling off the workpiece. With the new calliper gauge the measuring pressure between the anvils of the calliper and the cylindrical surface to be checked depends upon the weight of the gauge and is quite independent of the human element. By reason of these advantages the new calliper gauge is particularly suitable for incorporation—in conjunction with further conveniently built calliper gauges carried together with it on a common holder—in a suitable device for the checking of several, preferably different, diameters on one workpiece.

With these and other objects in view, the invention consists of certain novel features of construction as will be particularly pointed out in the appended claims.

Figure 1:
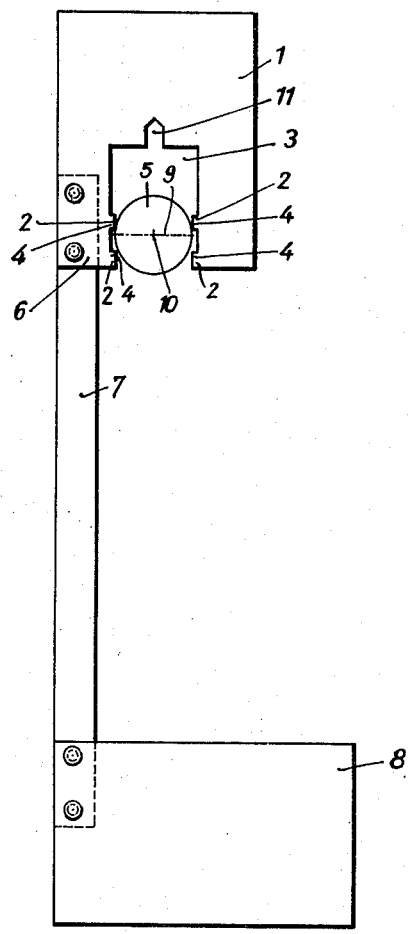
Figure 2:
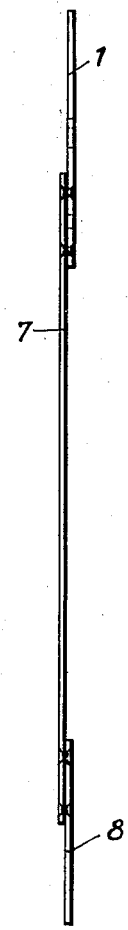

By way of example a calliper gauge embodying the invention will now be described with reference to the accompanying drawings in which:

Fig. 1 is a side elevation of an external calliper gauge placed on a horizontal cylindrical work, and Fig. 2 is a front elevation of the same gauge.

In the example illustrated the head of external calliper gauge consists of a flat plate 1 of sheet metal from which a section 3 has been removed. The lugs 2 in the cutout section 3 carry the anvils 4. If the diameter of the cylindrical work 5 is such that it will pass between the lower pair of anvils 4 but will not pass between the upper pair then the work 5 has the nominal size within the permissible tolerance.

One of the two measuring legs 6 of the plate 1 has an extension 7 to the end of which a weight 8 is attached. This weight 8 is so designed and arranged that the centre of gravity of the calliper gauge 1 as a whole lies underneath the horizontal plane 9 which goes through the axis 10 of the work 5. As a result of this position of the centre of gravity the calliper gauge, once it has been placed on the horizontal work, is automatically maintained in its position and the measuring pressure in all measuring operations is due only to the weight of the gauge.

The cutout 3 is provided with a slot 11 in which, for example, a holder of a device can engage on which a major number of such calliper gauges may be arranged to enable the simultaneous measuring of several different diameters on one and the same work.

The foregoing description is directed solely towards the constructions illustrated, but I desire it to be understotod that I reserve the privilege of resorting to all mechanical changes to which the device is susceptible, the invention being defined and limited only by the terms of the appended claims.

Having thus described the invention, what I claim as new and desire to secure by Letters Patent is:

1. A gauge for checking the external diameter of a cylindrical work piece supported in a horizontal position, comprising, in combination, a first plate portion formed with a cutout extending inwardly from an edge thereof along a predetermined axis to provide said plate portion with a pair of opposite extensions, each of said extensions having a pair of lugs extending toward the other extension and said pairs of lugs being aligned with each other to provide a first set of lugs located opposite each other and adjacent to said edge of said plate portion and a second set of lugs located opposite each other and being distant from said edge of said plate portion, all of said lugs having end faces which are parallel to each other and to said predetermined axis and said end faces of said first set of lugs being located at a greater distance from each other than said end faces of said second set of lugs so as to determine whether the diameter of the work pieces is smaller than the distance between said first set of lugs and greater than the distance between said second pair of lugs; a second plate portion located in the same plane as said first plate portion, being spaced therefrom, and having an edge facing said edge of said first plate portion and located opposite said extensions thereof, said second plate portion forming a weight means to balance said first plate portion in a vertical plane on a cylindrical work piece with said second set of lugs in engagement with the work piece; and a bridge portion extending between and being connected to said second plate portion and one of said extensions of said first plate portion to interconnect said plate portions with each other, said bridge portion forming an elongation of said one extension and being connected to a side edge portion of said second plate portion, and said second plate portion being completely free except for its connection to said bridge portion so as to provide a free space between said second plate portion and the other of said extensions of said first plate portion.

2. A gauge for checking the external diameter of a cylindrical work piece supported in a horizontal position, comprising, in combination, a first plate portion formed with a cutout extending inwardly from an edge thereof along a predetermined axis to provide said plate portion with a pair of opposite extensions, each of said extensions having a pair of lugs extending toward the other extension and said pairs of lugs being aligned with each other to provide a first set of lugs located opposite each other and adjacent to said edge of said plate portion and a second set of lugs located opposite each other and being distant from said edge of said plate portion, all of said lugs having end faces which are parallel to each other and to said predetermined axis and said end faces of said first set of lugs being located at a greater distance from each other than said end faces of said second set of lugs so as to determine whether the diameter of the work piece is smaller than the distance between said first set of lugs and greater than the distance between said second pair of lugs; a second plate portion located in the same plane as said first plate portion, being spaced therefrom, and having an edge facing said edge of said first plate portion and located opposite said extensions thereof, said second plate portion forming a weight means to balance said first plate portion in a vertical plane on a cylindrical work piece with said second set of lugs in engagement with the work piece; and a bridge portion extending between and being connected to said second plate portion and one of said extensions of said first plate portion to interconnect said plate portions with each other, said bridge portion forming an elongation of said one extension and being connected to a side edge portion of said second pair portion, and said second plate portion being completely free except for its connection to said bridge portion so as to provide a free space between said second plate portion and the other of said extensions of said first plate portion, said second plate portion extending laterally beyond said other extension of said first plate portion.

References Cited in the file of this patent

UNITED STATES PATENTS

| Number | Name | Date |
|---|---|---|
| 1,377,238 | Williams | May 10, 1921 |
| 2,355,007 | Mitchell | Aug. 1, 1944 |

FOREIGN PATENTS

| Number | Country | Date |
|---|---|---|
| 392,091 | Germany | Apr. 28, 1922 |